UNITED STATES PATENT OFFICE.

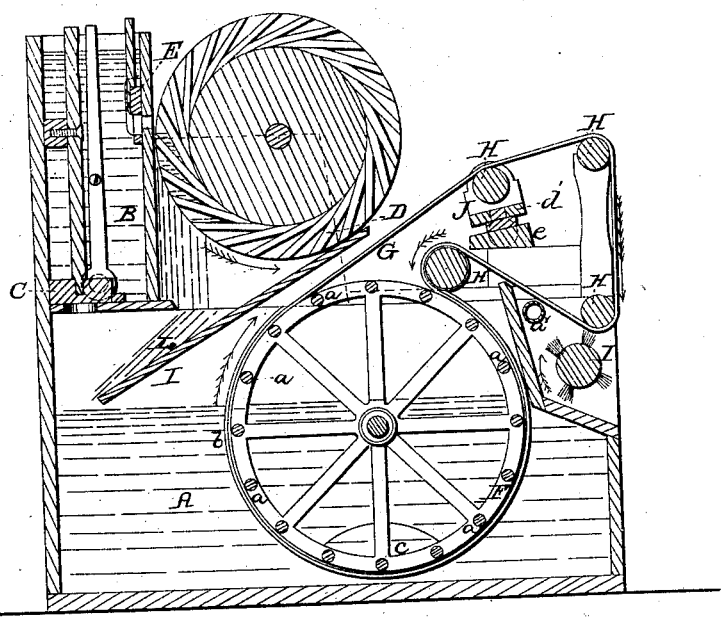
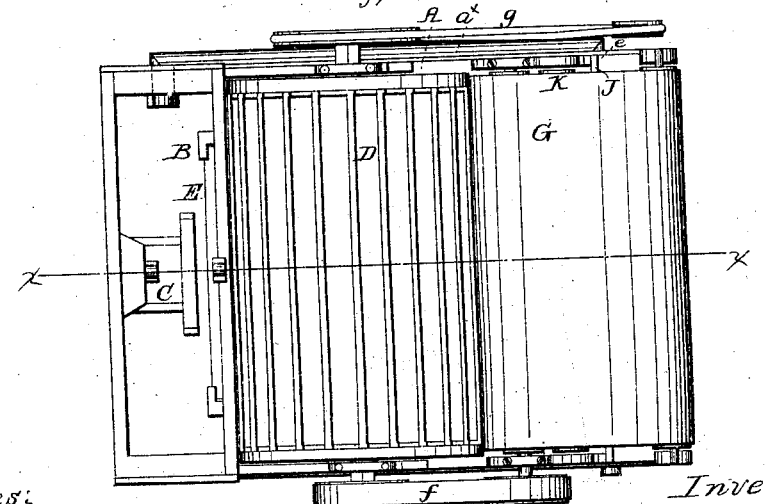

DANIEL N. DENMAN, OF MILLBURN, NEW JERSEY.

IMPROVEMENT IN LIQUID-FILTERS.

Specification forming part of Letters Patent No. 38,378, dated May 5, 1863; antedated December 25, 1862.

*To all whom it may concern:*

Be it known that I, DANIEL N. DENMAN, of Millburn, in the county of Essex and State of New Jersey, have invented a new and improved apparatus for purifying or filtering water or other liquids, designed for operating on a large scale; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the two figures.

The object of this invention is to obtain an apparatus for purifying or filtering water or other liquid, which will operate continuously and be self-cleaning and adapted for operation on a large scale for manufacturing purposes—such as the manufacture of paper and other articles in which a large quantity of pure water or other liquid is required.

To this end the invention consists substantially in the employment or use of an endless apron or roll of felt or other fibrous material passing around a wheel, the periphery of which is formed of parallel rods placed a suitable distance apart, said wheel being placed in a box or reservoir of water or other liquid and the apron driven by a wheel and cleansed by a revolving brush, the water or other liquid passing through the apron into the filter-wheel and discharged from the ends of the latter, as hereinafter fully shown and described.

To enable those skilled in the art to fully understand and construct my invention, I will proceed to describe it.

A represents a box or reservoir of water or other liquid, which may be of rectangular form and of any suitable dimensions, and having a penstock, B, at its upper part, communicating with the interior of box A by a valve, C.

D is a water-wheel or wheel to be turned by the liquid to be filtered, which is placed on the upper part of box A and receives its water from the penstock B through a gate, E, as shown in Fig. 1.

F is a wheel, which is placed in the box A and has its periphery formed of a series of rods or bars, $a$, placed at a suitable distance apart. The wheel F extends entirely across the box A, and has its ends fitted within annular pieces of packing $b$, which prevent water passing in between the ends of the wheels and the sides of the box. The sides of the box opposite each end of the wheel F have an opening, $c$, made in them to form an outlet or discharge opening at each end of the wheel.

G is an endless apron or roll, constructed of felt or other suitable fibrous material. This apron G passes around the wheel F, extends its whole width, and also passes around guide-rollers H, as shown in Fig. 1, the innermost guide-roller, H, causing the apron to hug the wheel F or extend around the greater portion of its periphery.

I is a brush-cylinder, which is placed at the front side of the box A and directly underneath a guide-roller, H, of the apron G, and J is a bar, which is secured centrally by a pivot, $d$, to a cross-bar, $e$, on the upper part of the box A. On the bar J there is placed a roller, K, which extends the whole width of the apron G, the latter passing over it, as shown in Fig. 1. The innermost guide-roller, H, is driven by a belt, $f$, from one end of the shaft of the water-wheel D, and the brush-cylinder I is driven by a belt, $g$, from the opposite end of the shaft of the water-wheel.

L is a chute or inclined board, which is placed underneath the wheel D, as shown in Fig. 1.

The operation is as follows: The water or other liquid to be purified or filtered passes from the penstock B into the box or reservoir A. The wheel D is turned by letting the liquid upon it from the penstock through the gate E, but this liquid, as it is discharged from the wheel, falls on the chute I and is conveyed into box A. The excess of liquid, or all more than is required to operate the wheel D, if any there be, passes through valve C directly into the box A, the valve being properly adjusted to effect such result. The endless apron G is moved by the innermost guide-roller, H, the latter being rotated from the wheel, as previously described, and the apron G rotates the wheel F in the box A. The liquid in box A passes through the apron G into the wheel, and is purified or filtered thereby, and is discharged from the center of said wheel through the openings $c$ in the sides of box A. The liquid, it will be understood, must pass through the apron G, as the ends of the wheel F are inclosed by packing to prevent it escaping at those points. The apron is cleansed by the revolving brush-cylinder I, so that it will be always kept clean, said brush-cylinder being kept moist by a tube, $a^{\times}$, leading from the penstock B. The roller K insures the apron G running straight over the guide-rollers H and wheel F. This is effected by the pivoted bar J, which, with the roller K, turns in an oblique direction, if the apron has an inclination to run toward either side, and the apron straight on the rollers. Thus it will be seen that the apparatus may operate continuously, is self-cleaning, and will operate on a large scale for the purpose of furnishing purified or filtered water in large quantities for manufacturing or other purposes.

Having thus described my invention, what I claim as new, and desire to secure by Letters Patent, is—

1. A device for filtering water and other liquids, composed of a wheel, F, fitted in a reservoir, A, and provided with an endless apron or roll, G, of felt or other fibrous material, when all are arranged in such a manner that the liquid to be filtered will pass from the reservoir through the apron or roll into the wheel and be discharged from the ends of the latter, substantially as set forth.

2. In combination with the reservoir A, wheel F, and apron or roll G, the rotary brush-cylinder I, when used as and for the purpose set forth.

3. The pivoted bar J, with roller K attached, in combination with the apron or roll G, wheel F, and reservoir A.

4. The driving-wheel D and penstock B, when combined and arranged with the reservoir A, wheel F, and apron or roll G, to operate as and for the purpose herein specified.

DANIEL N. DENMAN.

Witnesses:
JAMES LAIRD,
R. GAWLEY.